US007800677B2

(12) United States Patent
Abe

(10) Patent No.: US 7,800,677 B2
(45) Date of Patent: Sep. 21, 2010

(54) IMAGING DEVICE, IMAGING METHOD AND PROGRAM THEREOF

(75) Inventor: Yoshinori Abe, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 874 days.

(21) Appl. No.: 11/337,242

(22) Filed: Jan. 20, 2006

(65) Prior Publication Data

US 2006/0164536 A1 Jul. 27, 2006

(30) Foreign Application Priority Data

Jan. 24, 2005 (JP) ............................ 2005-015938

(51) Int. Cl.
*H04N 5/222* (2006.01)

(52) U.S. Cl. ............................ 348/333.01; 348/333.02; 348/333.04; 348/333.05; 348/333.11; 348/333.12

(58) Field of Classification Search ............ 348/333.01, 348/333.02, 333.04, 333.05, 333.11, 333.12, 348/231.2, 231.3, 231.5, 231.6, 239; 382/311
See application file for complete search history.

(56) References Cited

U.S. PATENT DOCUMENTS 7,038,724 B2 5/2006 Satoh et al.
7,349,011 B2 * 3/2008 Hirasawa, Masahide .............. 348/207.99
2004/0201741 A1 * 10/2004 Ban ........................ 348/231.3

FOREIGN PATENT DOCUMENTS

JP 4-26831 A 1/1992
JP 11-27616 A 1/1999
JP 11308490 A * 11/1999
JP 2002-010133 A 1/2002
JP 2003-319327 A 11/2003

OTHER PUBLICATIONS

Japanese Office Action dated Jun. 25, 2009 (2 pages), and English translation thereof (2 pages), issued in counterpart Japanese Application Serial No. 2005-015938.

* cited by examiner

*Primary Examiner*—Yogesh K Aggarwal
(74) *Attorney, Agent, or Firm*—Frishauf, Holtz, Goodman & Chick, P.C.

(57) ABSTRACT

When an imaging device is set to a BS shooting mode, the imaging device goes into a through-image display state of an object being shot. When a user operates a SET-key, the imaging device is changed to a detailed-screen state in which a sample image, etc., corresponding to each shooting scene is singly displayed. When the user operates a Wide-key of the zoom key in the detailed-screen display state, the imaging device is changed to a multi-screen state of the sample image corresponding to each shooting scene. The user can select a sample image in the detailed-screen state and the multi-screen state. When the user selects a sample image and operates the SET-key, the parameters of the shooting scene corresponding to the selected sample image are set as shooting conditions and the imaging device returns to the through-image display state.

8 Claims, 9 Drawing Sheets

THROUGH-DISPLAY STATE

BS

SELECT A SCENE BY SET

103

AFTER TWO SECONDS

BS 1
2
3
LENS DRIVE BLOCK
4
5
CCD
6
TG
7
CDS／AGC／AD
8
DRAM
9
ROM
10
MEMORY
11
CPU
12
FLASH MEMORY
13
IMAGE-DISPLAY SECTION
14
KEY INPUT SECTION
15
ELECTRONIC-FLASH DRIVE SECTION
16
ELECTRONIC-FLASH LIGHT EMITTING SECTION
17
CARD I/F
18
MEMORY CARD

| | SCENE | FOCUS AF | SHUTTER SPEED | APERTURE | EXPOSURE-VALUE SHIFT | SPEED | FILTER | EXPOSURE MODE | PHOTOMETRIC METHOD | WHITE BALANCE | COLOR EMPHASIS | AMOUNT OF FLASH LIGHT | SHARPNESS | CHROMA-TICNESS | CONTRAST | FLASH |
|---|---|---|---|---|---|---|---|---|---|---|---|---|---|---|---|---|
| 1 | PERSON AND SCENERY-1 | AF (AREA-1) | AUTOMATIC | AUTOMATIC | 0 | STANDARD | × | P (NORMAL) | MULTIPLE | AUTOMATIC | × | STANDARD | STANDARD | STANDARD | STANDARD | AUTOMATIC |
| 2 | PERSON AND SCENERY-2 | AF (AREA-2) | AUTOMATIC | AUTOMATIC | 0 | STANDARD | × | P (NORMAL) | MULTIPLE | AUTOMATIC | × | STANDARD | STANDARD | STANDARD | STANDARD | AUTOMATIC |
| 3 | CLOSE-UP | AF (AREA-3) | AUTOMATIC | AUTOMATIC | 0 | STANDARD | × | P (OPEN) | MULTIPLE | AUTOMATIC | FLESH COLOR | STANDARD | <SOFT> | STANDARD | STANDARD | AUTOMATIC |
| 4 | BUST-SHOT | AF (AREA-4) | AUTOMATIC | AUTOMATIC | 0 | STANDARD | × | P (OPEN) | MULTIPLE | AUTOMATIC | FLESH COLOR | STANDARD | <SOFT> | STANDARD | STANDARD | AUTOMATIC |
| 5 | KNEE-SHOT | AF (AREA-5) | AUTOMATIC | AUTOMATIC | 0 | STANDARD | × | P (OPEN) | MULTIPLE | AUTOMATIC | FLESH COLOR | STANDARD | <SOFT> | STANDARD | STANDARD | AUTOMATIC |
| 6 | TWO-SHOT | AF (AREA-6) | AUTOMATIC | AUTOMATIC | 0 | STANDARD | × | P (OPEN) | MULTIPLE | AUTOMATIC | FLESH COLOR | STANDARD | STANDARD | STANDARD | STANDARD | AUTOMATIC |
| 7 | CLOSE-UP OF A FLOWER | MACRO | AUTOMATIC | AUTOMATIC | 0 | STANDARD | × | P (OPEN) | MULTIPLE | AUTOMATIC | × | WEAK | STANDARD | <HIGH> | STANDARD | AUTOMATIC |
| 8 | FLOWER GARDEN | AF | AUTOMATIC | AUTOMATIC | 0 | STANDARD | × | P (NORMAL) | MULTIPLE | AUTOMATIC | × | STANDARD | STANDARD | <HIGH> | STANDARD | AUTOMATIC |
| 9 | WOODS | AF | AUTOMATIC | AUTOMATIC | −1 | STANDARD | × | P (NORMAL) | CENTER-WEIGHTED | AUTOMATIC | GREEN | STANDARD | <HARD> | <HIGH> | STANDARD | AUTOMATIC |
| 10 | AUTUMN LEAVES | AF | AUTOMATIC | AUTOMATIC | 0 | STANDARD | × | P (NORMAL) | MULTIPLE | AUTOMATIC | RED | STANDARD | <HARD> | <HIGH> | STANDARD | AUTOMATIC |
| 11 | BLUE SKY | ∞ | AUTOMATIC | AUTOMATIC | 0 | STANDARD | × | P (NORMAL) | MULTIPLE | AUTOMATIC | BLUE | STANDARD | STANDARD | STANDARD | STANDARD | AUTOMATIC |
| 12 | SETTING SUN | ∞ | AUTOMATIC | AUTOMATIC | 0 | STANDARD | RED | P (NORMAL) | MULTIPLE | FIXED (SUNLIGHT) | × | STANDARD | STANDARD | <HIGH> | STANDARD | AUTOMATIC |
| 13 | SUMMER SEA | AF | AUTOMATIC | AUTOMATIC | 1 | STANDARD | × | P (NORMAL) | CENTER-WEIGHTED | AUTOMATIC | BLUE | STANDARD | STANDARD | STANDARD | STANDARD | AUTOMATIC |

| SCENE | | SCENE CONTENT | ADVICE INFORMATION | CONTROL DESCRIPTION |
|---|---|---|---|---|
| 1 | PERSON AND SCENERY-1 | SHOOTS PERSON AND SCENERY | | |
| 2 | PERSON AND SCENERY-2 | SHOOTS PERSON AND SCENERY | | |
| 3 | CLOSE-UP | SHOOTS IN CLOSE-UP | BACKGROUND IS FINELY BLURRED USING ZOOM | |
| 4 | BUST-SHOT | TAKES A BUST-SHOT | BACKGROUND IS FINELY BLURRED USING ZOOM | |
| 5 | KNEE-SHOT | TAKES A KNEE-SHOT | BACKGROUND IS FINELY BLURRED USING ZOOM | |
| 6 | TWO-SHOT | TAKES A TWO-SHOT | BACKGROUND IS FINELY BLURRED USING ZOOM | |
| 7 | CLOSE-UP OF A FLOWER | SHOOTS A FLOWER IN CLOSE-UP | | GOES INTO MACRO MODE AND CHROMATICNESS IS SET TO HIGH |
| 8 | FLOWER GARDEN | SHOOTS A FLOWER GARDEN | | CHROMATICNESS IS SET TO HIGH |
| 9 | WOODS | SHOOTS WOODS | | SHARPNESS IS SET TO HARD, CHROMATICNESS IS SET TO HIGH, AND COLOR-EMPHASIS IS SET TO GREEN |
| 10 | AUTUMN LEAVES | SHOOTS AUTUMN LEAVES | | SHARPNESS IS SET TO HARD, CHROMATICNESS IS SET TO HIGH, AND COLOR-EMPHASIS IS SET TO RED |

THROUGH-DISPLAY STATE
BS
SELECT A SCENE BY SET
AFTER TWO SECONDS
103
BS
SET-KEY
SET-KEY
DETAILED SCREEN STATE
103
SHOOTS THE SETTING SUN
FOCUS IS SET TO ∞, FILTER IS SET TO RED
GO TO SCENE No.11
GO TO SCENE No. 13
SET-KEY
SET-KEY
ZOOM (TELE-KEY)

ZOOM (WIDE-KEY)
MULTIPLE-SCREEN STATE
BEST SHOT
1
2
3
4
5
6
7
8
9
10
11
12
SHOOTS THE SETTING SUN

IMAGING DEVICE, IMAGING METHOD AND PROGRAM THEREOF

CROSS-REFERENCE TO RELATED APPLICATION

This application is based upon and claims the benefit of priority from the prior Japanese Patent Application No. 2005-15938, filed Jan. 24, 2004, the entire contents of which is incorporated herein by reference.

BACKGROUND OF THE INVENTION

1. Field of the Invention

The present invention relates to an imaging device, an imaging method and a program thereof. More particularly, the present invention relates to an imaging device capable of setting shooting conditions suitable for a situation where a user is going to take a shot, an imaging method, and a program thereof.

2. Description of the Related Art

To date, imaging devices, for example a digital camera, have allowed a user to arbitrarily set shooting conditions such as an aperture, a shutter speed, etc., or to have them automatically set. Also, in some digital cameras that have appeared in the marketplace, a user can select from shooting scenes such as a piece of scenery, a portrait, etc., and the shooting conditions corresponding to each shooting scene are provided in advance. Thus, a user is allowed to select a suitable shooting scene in accordance with a shooting situation of the user in order to set the shooting conditions corresponding to the selected shooting scene.

SUMMARY OF THE INVENTION

In accordance with an aspect of the present invention, there is provided an imaging device which comprises a display control section for simultaneously displaying a plurality of sample images in a display section; a selection section for selecting any one sample image from the plurality of sample images simultaneously displayed in the display section by the display control section; and a setting section for setting an imaging condition corresponding to the sample image selected by the selection section.

In accordance with another aspect of the present invention, there is provided a method of imaging using an imaging device; the method comprises a display control step of simultaneously displaying a plurality of sample images in the display section; a selection step of selecting any one sample image from a plurality of sample images simultaneously displayed in the display section by the display control step; and a setting step of setting a shooting condition corresponding to the selected sample image.

In accordance with still another aspect of the present invention, there is provided a program executed by a processor in a imaging device which comprises a display processing step of simultaneously displaying a plurality of sample images in a display section; a selection processing step of selecting any one sample image from a plurality of sample images simultaneously displayed in the display section; and a setting processing step of setting a shooting condition corresponding to the sample image selected by the selection processing step.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a diagram illustrating shooting parameter data 101 stored in a ROM 9;

FIG. 3 is a diagram illustrating additional information data 102 stored in the ROM 9;

DESCRIPTION OF THE PREFERRED EMBODIMENTS

Hereinafter, the preferred embodiments of the present invention will be described in detail with reference to the drawings.

A. Configuration of a Digital Camera

Figure 1:
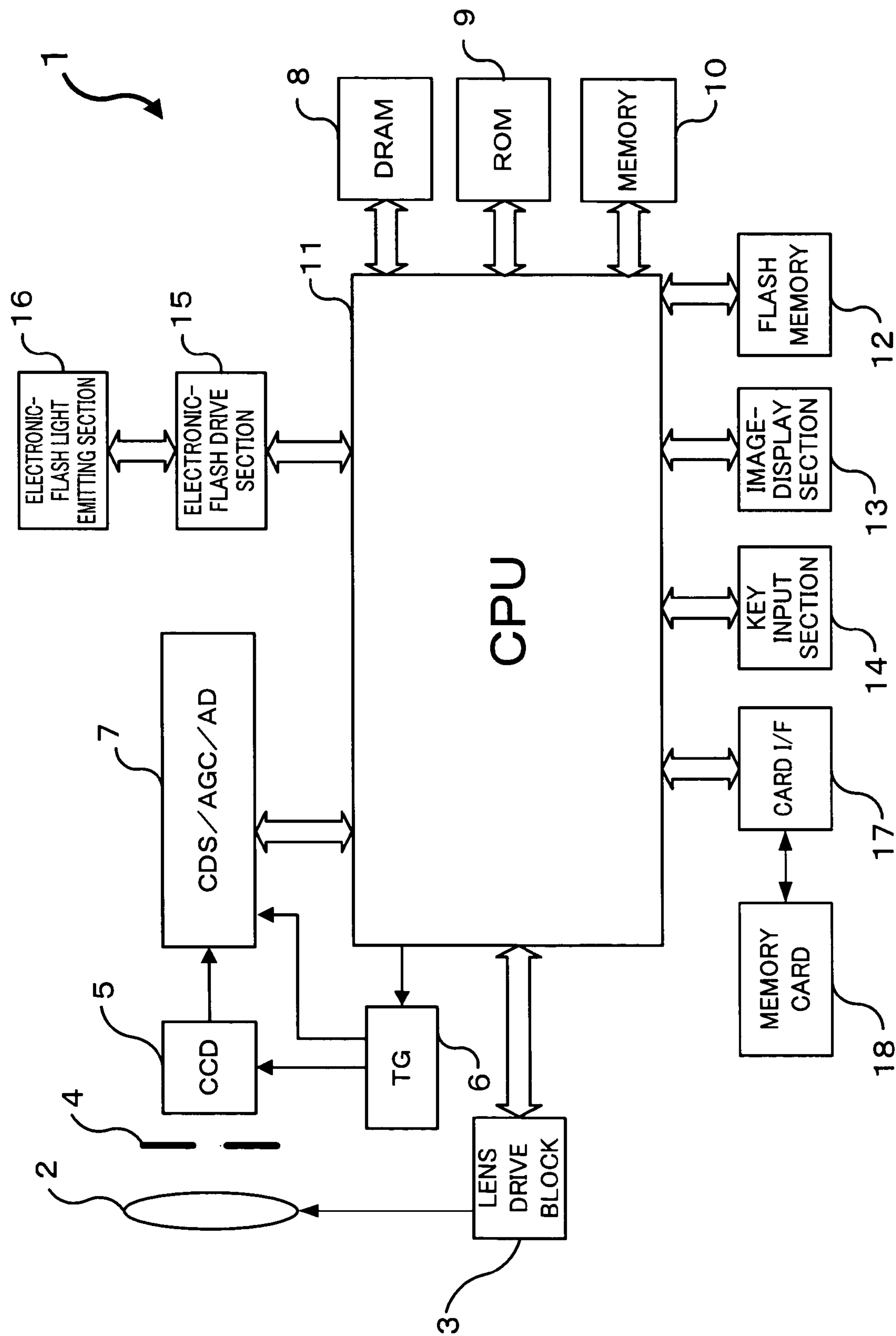
FIG. 1 is a block diagram of a digital camera according to an embodiment of the present invention.

FIG. 1 is a block diagram schematically illustrating an electrical configuration of a digital camera 1 as an imaging device according to an embodiment of the present invention.

The digital camera 1 includes a capture lens 2, a lens drive block 3, a combination aperture and shutter 4, a CCD (charge-coupled device) 5, a TG (timing generator) 6, a unit circuit 7, a DRAM 8, a ROM 9, a memory 10, a CPU 11, a flash memory 12, an image-display section 13, a key input section 14, an electronic-flash drive section 15, an electronic-flash light emission section 16, and a card I/F (interface) 17. The card I/F 17 is connected to a memory card 18 removably inserted in the card slot of the main unit of the digital camera 1.

The capture lens 2 includes a focus lens and a zoom lens, which are not shown, and is connected to the lens drive block 3. The lens drive block 3 includes motors which drive the focus lens and the zoom lens in their respective axial directions, and a focus-motor driver and a zoom-motor driver which drive the focus motor and the zoom motor in their respective axial directions, respectively, in accordance with control signals from the CPU 11.

The combination aperture and shutter 4 includes a drive circuit which is not shown. The drive circuit operates the combination aperture and shutter 4 in accordance with the control signal sent from the CPU 11. The combination aperture and shutter 4 functions as an aperture and a shutter.

The aperture refers to a mechanism which controls the amount of light entering from the capture lens 2. The shutter refers to a mechanism which controls the time period of exposing light to the CCD 5. The time period of exposing the CCD 5 to light is changed depending on the speed of the opening and closing of the shutter (shutter speed). The exposure can be determined by the aperture and the shutter speed.

The CCD 5 converts the light of an object being shot, which is projected through the capture lens 2 and the combination aperture and shutter 4, into an electronic signal, and outputs it to the unit circuit 7 as an imaging signal. Also, the CCD 5 is driven in accordance with the timing signal having a predetermined frequency produced by the TG 6. The unit circuit 7 is connected to the TG 6.

The unit circuit 7 includes a CDS (correlated double sampling) circuit which performs correlated double sampling on the imaging signal output from the CCD 5 and maintains the signal, an AGC (automatic gain control) circuit which performs automatic gain control on the imaging signal after the sampling, and an A/D converter which converts an analog imaging signal after the automatic gain control into a digital signal. The imaging signal of the CCD 5 is sent to the CPU 11 through the unit circuit 7 as a digital signal.

The CPU 11 is a one-chip microcomputer for controlling each part of the digital camera 1 and has functions of performing image processing (pixel interpolation processing, γ-correction, generation of luminance and color-difference signals, white-balance processing, exposure correction processing, etc.) of the image data sent from the unit circuit 7, compression and expansion processing (for example, compression and expansion of the image data into a JPEG format or an MPEG format), etc.

The DRAM 8 is used as a buffer memory which temporarily stores the image data sent from the CPU 11 after being captured by the CCD 5 and is used as a working memory of the CPU 11.

The flash memory 12 and the memory card 18 are recording media for storing the image data captured by the CCD 5. In regard to this, in the present embodiment, a description will be given of the writing (recording) of the image data exclusively using the flash memory 12. However, it is possible to select whether to record the image data onto the flash memory 12 or onto the memory card 18 by the user's operation of the key input section 14.

The image-display section 13 includes a color LCD and the drive circuit thereof. The image-display section 13 displays the object being shot captured by the CCD 5 as a through-image in a shooting-standby state and displays the recorded image read from the flash memory 12 or the memory card 18 used for storage and expanded at reproduction time of the recorded image. This image-display section 13 corresponds to the display section of the present invention. The key input section 14 includes a plurality of operation keys such as a BS (best shot) key, a shutter button, a SET-key, a crisscross-key, a zoom key (including a Tele-key and a Wide-key), etc., and outputs the operation signal corresponding to the user's key operation to the CPU 11. The key input section 14 functions as a specification section of the present invention.

The electronic-flash drive section 15 drives the electronic-flash light emission section 16 to flash light in accordance with the control signal of the CPU 11. The electronic-flash light emission section 16 emits electronic-flash light. The CPU 11 determines whether the shooting scene is dark or not by means of the output signal of the CCD 5 or with a photometric circuit which are not shown. If the shooting scene is determined to be dark and the shooting is performed (when the shutter-button is pressed), the CPU 11 sends the control signal to the electronic-flash drive section 15.

The ROM 9 stores the programs necessary for the CPU 11 to control each section of the digital camera 1 and the data necessary for controlling each section. The CPU 11 functions as the display control section, the selection section, the determination section, the setting section, the display-mode selection section, the first storage control section, and the second storage control section by executing the programs stored in the ROM 9.

Also, the ROM 9 stores shooting parameter data 101 indicating the parameters of the shooting conditions corresponding to each shooting scene as shown in FIG. 2, additional information data 102 indicating the additional information corresponding to each shooting scene as shown in FIG. 3, and image data constituting the sample images 103 corresponding to individual shooting scenes as shown in FIG. 4.

The shooting parameter data 101 indicates the parameters of the shooting conditions of the digital camera 1 corresponding to the shooting scenes that can be selected in the best-shot shooting mode described below. The shooting parameter data 101 includes the parameters indicating the contents of the control items such as a focus control, a shutter speed, an aperture, an amount of EV shift, etc.

The additional information data 102 is additional information recorded corresponding to each shooting scene. Specifically, the additional information data 102 includes three types of comment information, that is to say, the scene content such as "shoots a person and scenery", advice information such as "clearly shot using a zoom", and a control description such as "becomes macro mode and the chromaticness is set to high".

Figure 4A:
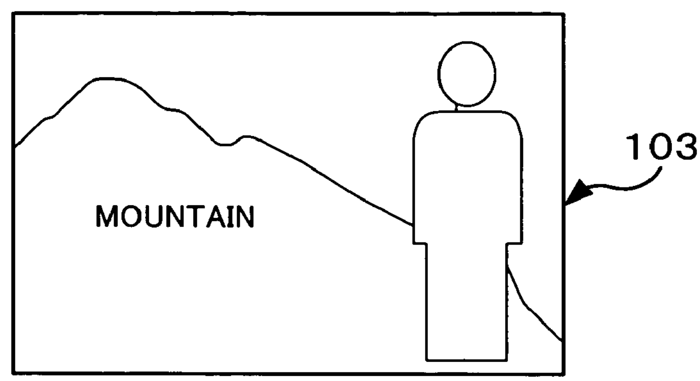
FIGS. 4A to 4C are views illustrating image data constituting sample-image data 103 stored in the ROM 9.
Figure 4B:
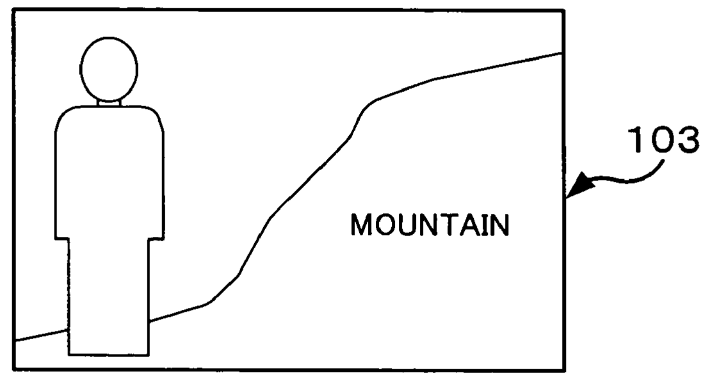
Figure 4C:
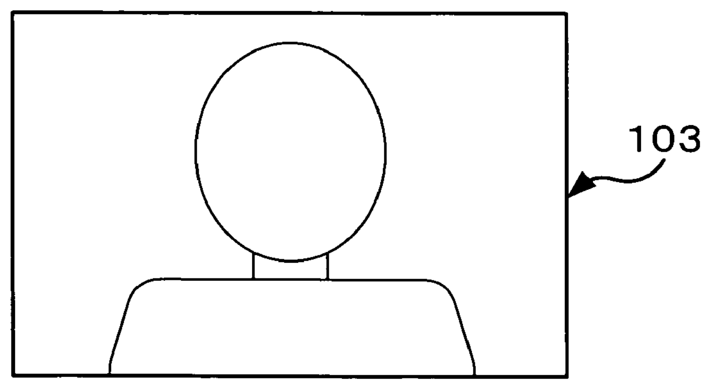

The sample images 103 are recorded corresponding to shooting scenes together with the shooting parameter data 101 and the additional information data 102, and indicate the sample images obtained when shooting is performed under the shooting conditions of individual shooting scenes. FIG. 4A corresponds to the shooting scene number "1" (person and scenery 1). FIG. 4B corresponds to the shooting scene number "2" (person and scenery 2). FIG. 4C corresponds to the shooting scene number "3" (close-up).

Also, the memory 10 has a storage area A for storing information for identifying the selected sample image and information indicating the display mode (detailed mode and multiple mode) at the time of the selection of the sample image when the user selects any one of the sample images and operates the SET key as describe below, and a storage area B for storing the shooting conditions of the shooting scenes corresponding to the sample image.

B. Operation of the Digital Camera 1

A description will be given of the operation of the digital camera 1 according to a first embodiment in accordance with the flowcharts in FIGS. 5 to 7, and FIGS. 8A to 8D, which shows the screens displayed in the image-display section 13.

First, when the user operates the BS-key of the key input section 14, the CPU 11 sets the best-shot shooting mode, and starts so-called through-image display, that is to say, starts the imaging of the object being shot by the CCD 5, performs image processing on the image data of the object captured by the CCD 5, stores the data into the buffer memory (DRAM 8), and displays the image of the stored image data on the image-display section 13 (step S1).

Next, one sample image is selected from the image data recorded in the ROM 9 on the basis of the information identifying the sample image stored in the storage area A of the memory 10, and the shooting conditions of the shooting scene corresponding to the selected sample image are obtained from the shooting parameter data 101 and is stored in the storage area B of the memory 10. That is to say, the shooting conditions are set (step S2). Here, if the information for identifying the sample image is not stored in the memory 10, the sample image corresponding to the shooting scene number "1" is selected. In this regard, here, it is assumed that the sample image corresponding to the shooting scene number "12" is selected.

Next, the CPU 11 reads the selected sample image and displays the read sample image and the guidance together with the through-image of the object for a certain time period (for example, two seconds)(step S3).

Figures 8A, 8B, 8C, 8D:
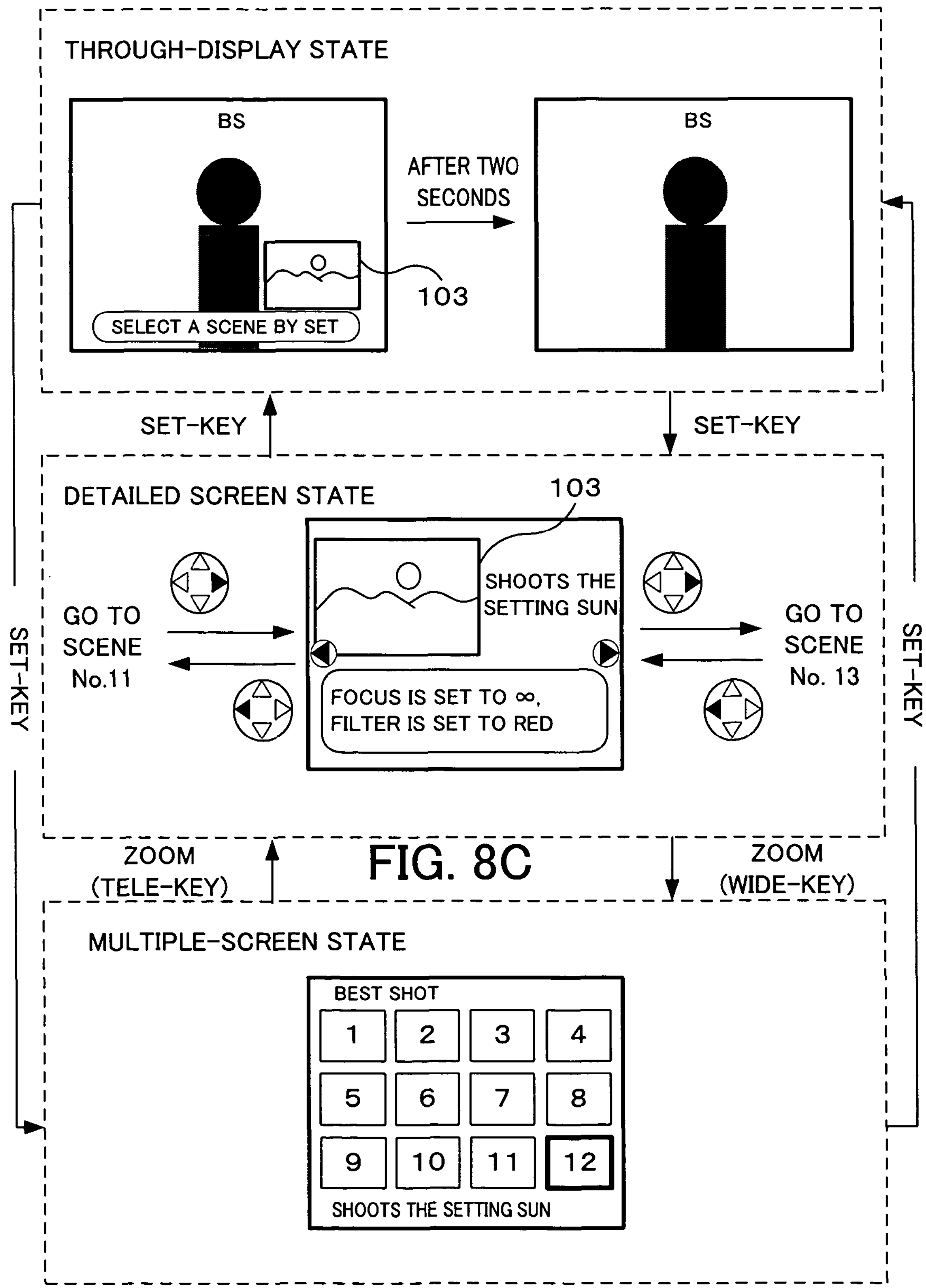
FIGS. 8A to 8D are views illustrating screens displayed in an image-display section 13 in a BS imaging mode.

FIG. 8A is a view illustrating the image-display section 13 in which the selected sample image 103 and the guidance of "select a scene by SET" are displayed along with the through-image of the object. After the elapse of two seconds, the image-display section 13 enters a state of displaying only the through-image of the object as shown in FIG. 8B.

Next, the CPU 11 determines whether the SET-key operation has been performed by the user (step S4). This determination is made by determining whether the operation signal corresponding to the SET-key operation is sent from the key input section 14. Here, if the user operates the SET-key, the state is changed into a display mode allowing the selection of the shooting scenes. For the display mode allowing the selection of the shooting scenes, there are two modes, that is to say, a detailed mode and a multiple mode. In the following, a description will be given of the detailed mode and the multiple mode.

In step S4, if it is determined that the SET-key has been operated, the processing proceeds to step S5. The CPU 11 determines whether the information indicating that the sample image has been selected in the detailed mode is stored in the storage area A of the memory 10.

Figure 6:
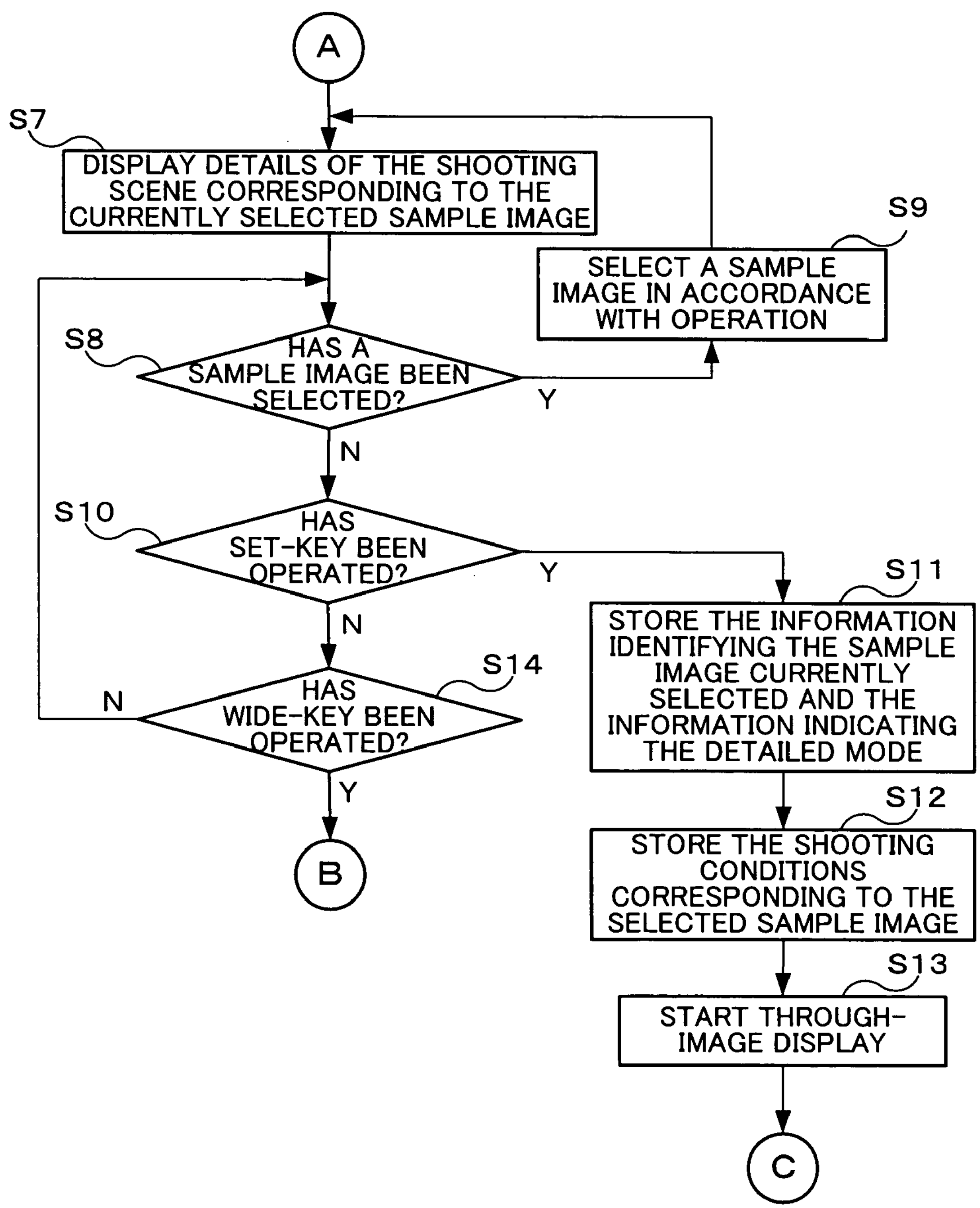
FIG. 6 is a flowchart illustrating the operation of the digital camera according to the embodiment of the present invention.

In step S5, if it is determined that the information indicating the detailed mode is stored in the storage area A of the memory 10, the processing proceeds to step S7 in FIG. 6. If it is determined that the information indicating the detailed mode is not stored, the processing proceeds to step S6, and it is determined whether the information indicating the multiple mode is stored in the memory 10.

Figure 7:
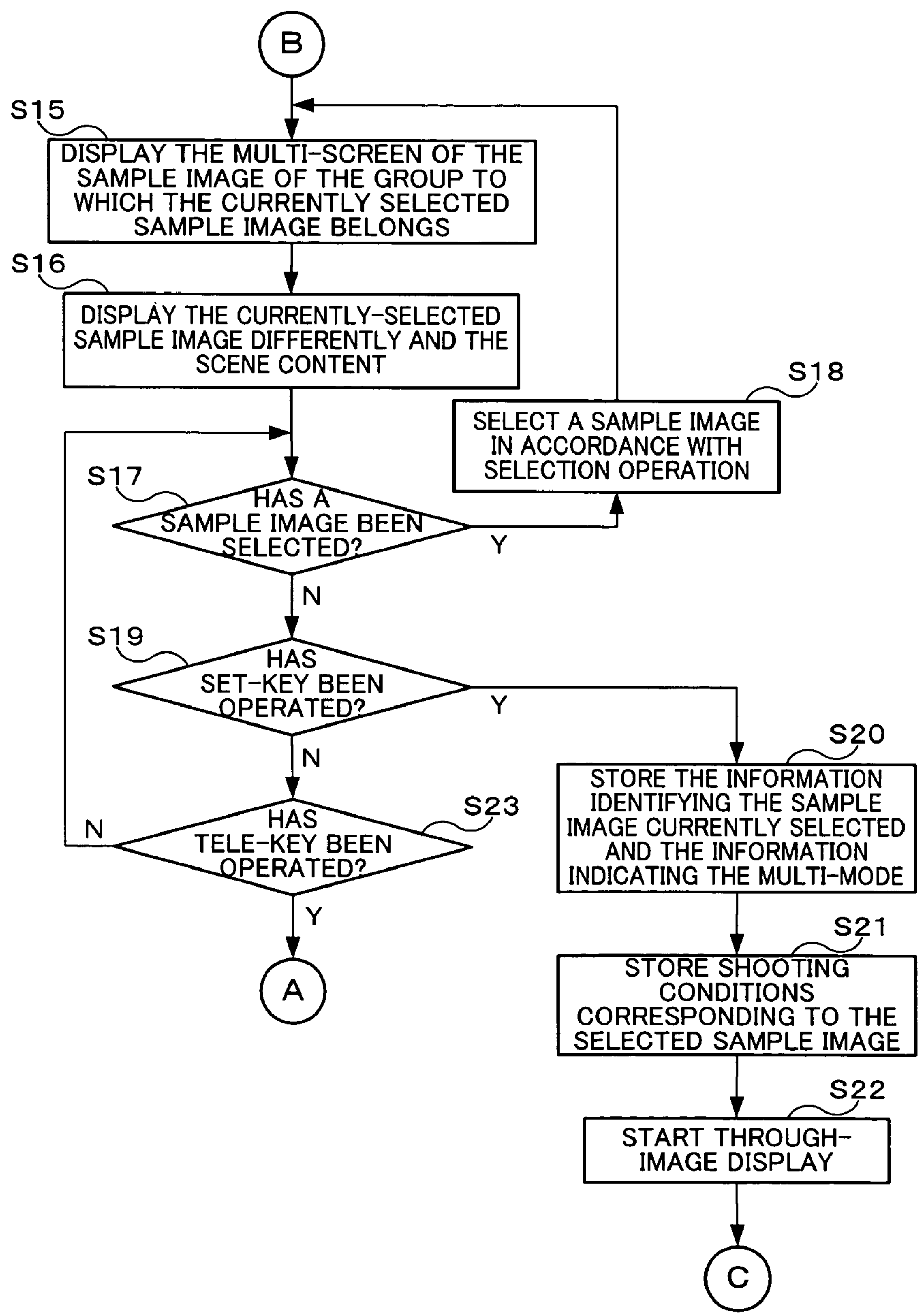
FIG. 7 is a flowchart illustrating the operation of the digital camera according to the embodiment of the present invention.

In step S6, if it is determined that the information indicating the multiple mode is stored in the memory 10, the processing proceeds to step S15 in FIG. 7. If it is determined that the information indicating the multiple mode is not stored in the memory 10 either, the processing proceeds to step S7 in FIG. 6.

When the processing proceeds to step S7 in FIG. 6, the CPU 11 displays the details of the shooting scene corresponding to the currently selected sample image in the image-display section 13. Here, the details of the shooting scene corresponding to the selected sample image refers to the contents of the shooting scene recorded in the additional information data in the memory 9, the advice information, the control description, etc., in addition to the selected sample image.

FIG. 8C illustrates a view when the details of the shooting scene corresponding to the selected sample image are displayed in the image-display section 13.

Here, the sample image corresponding to the shooting scene number "12" is selected. Thus, a sentence stating "shoots the setting sun" indicating the contents of the shooting scene "12" and a sentence stating "The focus is set to ∞, and the filter is set to red", which are control descriptions, are displayed in addition to the selected sample image. In this regard, the shooting scene "12" has no advice information so no advice information is displayed. However, if there is advice information, the advice information is displayed.

Next, the CPU 11 determines whether the user has selected a sample image (step S8). This determination is made on the basis of whether the operation signal corresponding to the operation of a crisscross-key operation has been sent from the key input section 14.

In step S8, if it is determined that a sample image has been selected, the CPU 11 selects a new sample image in accordance with the user's operation of the crisscross-key (in accordance with the operation signal sent from the key input section 14) (step S9) and the processing returns to step S7 to display the details of the shooting scene corresponding to the selected sample image.

Here, in the state shown in FIG. 8C, the user can select a sample image by operating the crisscross-key. For example, if the user operates "→" of the crisscross-key, a sample image next to the currently selected sample image, that is to say, if the currently selected sample image is the image having the shooting scene number "12", the sample scene of the shooting scene number "13", can be selected. Also, if the user operates "←" of the crisscross-key, a sample image immediately before the currently selected sample image, that is to say, if the currently selected sample image is the image having the shooting scene number "12", the sample scene having the shooting scene number "11", can be selected. This means that if the "←" key is operated, the shooting scene number of the sample image to be selected is decremented, and if the "→" key is operated, the shooting scene number of the sample image to be selected is incremented.

On the other hand, in step S8, if it is determined that a sample image has not been selected, the CPU 11 determines whether or not the SET key has been operated (step S10).

In step S10, if it is determined that the SET key has been operated, the processing proceeds to step S11, and the CPU 11 stores the information identifying the sample image currently selected and the information indicating the detailed mode in the storage area A of the memory 10. That is to say, the information is finally stored in the memory 10. Thus, when the user shoots an object in the BS shooting mode next time, the sample image corresponding to the shooting scene captured the previous time is selected. Also, the sample image can be selected in the same display mode when that sample image has been selected. In this regard, when the memory 10 already stores the information identifying the sample image currently selected and the information indicating the detailed mode, the information may be overwritten or the information may be kept as history without being overwritten.

Next, in step S12, the CPU 11 obtains the shooting conditions of the shooting scene corresponding to the selected sample image from the shooting parameter data 101 and overwrites the shooting conditions in the storage area B of the memory 10.

Figure 5:
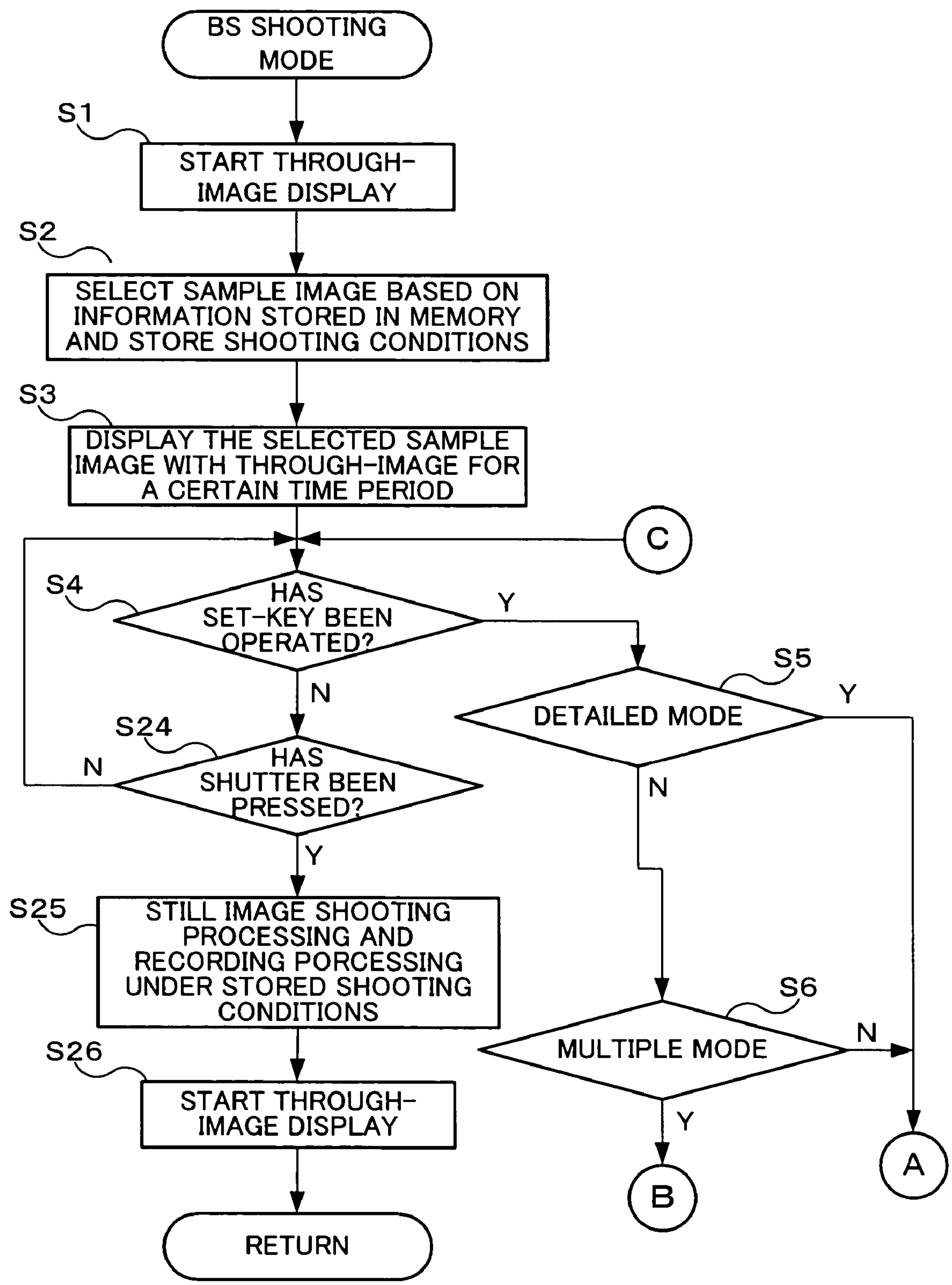
FIG. 5 is a flowchart illustrating the operation of the digital camera according to the embodiment of the present invention.

Next, the CPU 11 starts the through-image display of the object (step S13) and the processing returns to step S4 in FIG. 5.

At the same time, in step S10, if it is determined that the SET-key has not been operated, the CPU 11 determines whether the Wide-key of the zoom key has been operated (step S14). This determination is made on the basis of whether the operation signal corresponding to the Wide-key operation has been sent from the key input section 14.

In step S14, if it is determined that the Wide-key has not been operated, the processing returns to step S8. In step S14, if it is determined that the Wide-key has been operated, the processing proceeds to step S15 in FIG. 7.

When the processing proceeds to step S15 in FIG. 7, the CPU 11 displays the multiple-screen of the sample image of the group to which the currently selected sample image belongs in the image-display section 13. The group to which the currently selected sample image belongs is formed by separating sample images into groups each including 12 sample images. For example, the sample images having the shooting scene numbers from "1" to "12" are bunched together in one group and the sample images having the shooting scene numbers from "13" to "24" are bunched together in another group. Accordingly, since the sample image having the shooting scene number "12" is currently selected, the sample images of the multiple-screen to be displayed are the sample images having the shooting scene numbers from "1" to "12".

FIG. 8D shows the state at that time. Twelve sample images are displayed in FIGS. 8A to 8D. The number (1, 2, . . . , 12) shown in the sample image indicates that each sample image has an individual shooting scene number. That is to say, the sample image of the number 1 indicates that it is the sample image corresponding to the shooting scene number "1".

Next, the CPU 11 displays the currently selected sample image differently and also displays the contents of the shooting scene corresponding to the selected sample image (step S16). Here, the currently selected sample image is the sample image corresponding to the shooting scene number "12". Thus, the sample image number 12 is displayed with heavy-line frame (cursor-selected) and the sentence having the contents of the shooting scene number 12, "shoots the setting sun" is shown in the lower part of the multiple screen. Also, for example, if the sample image having the number 3 is selected, the sample image number 3 is cursor-selected and the contents of the scene, that is to say, the sentence "shoots in close-up", is shown in the lower part of the multiple screen.

Next, the CPU 11 determines whether the user has selected a sample image (step S17). This determination is made on the basis of whether the operation signal corresponding to the crisscross-key operation has been sent from the key input section 14.

In step S17, if it is determined that the user has selected a sample image, the CPU 11 selects a new sample image in accordance with the crisscross-key operation by the user (step S18) and the processing returns to step S15. The multiple-screen display is performed of the sample image of the group to which the currently selected sample image belongs. In step S16, the selected sample image is displayed differently, and at the same time, the contents of the scene are displayed.

Here, the user is allowed to select a sample image by operating the crisscross-key. For example, in a state where the sample image number 12 is selected, if "↑" of the crisscross-key is operated, the sample image to be selected is changed from the sample image number 8 to the sample image number 4. Also, in a state where the sample image number 12 is selected, if "←" of the crisscross-key is operated, the sample image to be selected is changed in descending order of the number, that is to say, in the order of the sample image number 11, the sample image number 10, the sample image number 9, and the sample image number 8.

Figure 9:
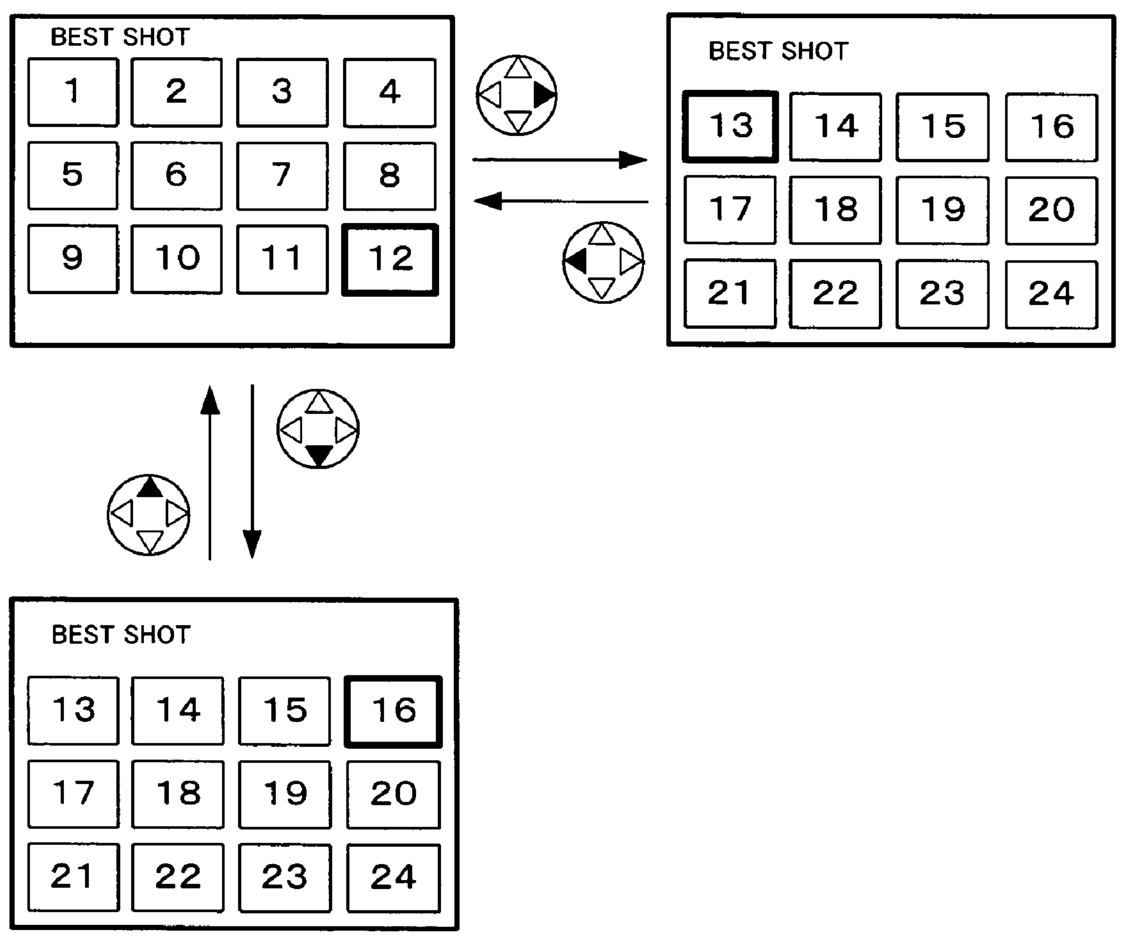
FIG. 9 is a view illustrating a multiple screen displayed in the image-display section 13 when a sample screen is selected in a multi-screen display state.

Also, in contrast, in a state where the sample image number 12 is selected, if "→" is operated, the multiple screen is changed to the multiple screen of the sample image number 13 to the sample image number 24 as shown in FIG. 9, and the sample image to be selected becomes the sample image number 13. Also, in a state where the sample image number 12 is selected, if "↓" is operated, the multiple screen is changed to the multiple screen of the sample image number 13 to the sample image number 24 as shown in FIG. 9, and the sample image to be selected becomes the sample image number 16.

On the other hand, in step S17, if it is determined that a sample image has not been selected, the CPU 11 determines whether the SET-key has been operated (step S19).

In step S19, if it is determined that the SET key has been operated, the processing goes to step S20, and the CPU 11 stores the information identifying the sample image currently selected and the information indicating the multiple mode in the storage area A of the memory 10. That is to say, the information is finally stored in the memory 10. Thus, when the user shoots an object in the BS shooting mode next time, the sample image corresponding to the shooting scene captured the previous time is selected. Also, the sample image is displayed in the same display mode when that sample image has been selected. In this regard, when the memory 10 already stores the information identifying the sample image currently selected and the information indicating the detailed mode, the information may be overwritten or the information may be kept as history without being overwritten.

Next, in step S21, the CPU 11 obtains the shooting conditions of the shooting scene corresponding to the selected sample image 103 from the shooting parameter data 101 and overwrites the shooting conditions in the storage area B of the memory 10.

Next, the CPU 11 starts the through-image display of the object (step S22) and the processing returns to step S4 in FIG. 5.

At the same time, in step S19, if it is determined that the SET-key has not been operated, the CPU 11 determines whether the Tele-key of the zoom key has been operated (step S23). This determination is made on the basis of whether the operation signal corresponding to the operation of the Tele-key of the zoom key has been sent from the key input section 14.

In step S23, if it is determined that the Tele-key has not been operated, the processing returns to step S17. In step S23, if it is determined that the Tele-key has been operated, the processing returns to step S7 in FIG. 6 (returns to the detailed mode as shown in FIG. 8C).

At the same time, in step S4 in FIG. 5, if it is determined that the SET-key has not been operated, the CPU 11 determines whether the user has pressed the shutter button (step S24). This determination is made on the basis of whether the operation signal corresponding to the pressing of the shutter button has been sent from the key input section 14.

In step S24, if it is determined that the shutter button has not been pressed, the processing returns to step S4. In step S24, if it is determined that the shutter button has been pressed, the processing proceeds to step S25.

When the processing proceeds to step S25, still-image shooting processing is performed under the shooting conditions stored in the storage area B of the memory 10 and the image data obtained by the shooting processing is recorded in the flash memory 12.

Next, the CPU 11 starts the display of the through-image of the object (step S26), the processing returns to step S4, and the above-described operation is repeated.

The digital camera 1 according to an embodiment of the present invention is not limited to the above-described embodiment. The digital camera 1 may be a cellular phone with a camera, a PDA (personal digital assistant) with a camera, a personal computer with a camera, an IC recorder with a camera, a digital video camera, etc. In summary, the digital camera 1 may be any device capable of shooting an object.

In this regard, the imaging program for an imaging device, which is an embodiment of the present invention, is stored in a memory (for example, a ROM, etc.) of the imaging device. However, in the case of producing, marketing, etc., the imaging program recorded on a recording medium, the program should also be included in the scope of protection. In that case, a recording medium, on which the imaging program is recorded, should be protected.

While the present invention has been described with reference to the preferred embodiments, it is our intention that the invention be not limited by any of the details of description thereof.

As this invention may be embodied in several forms without departing from the spirit of the essential characteristics thereof, the present embodiments are therefore illustrative and not restrictive since the scope of the invention is defined by the appended claims rather than by the description preceding them and all changes that fall within meets and bounds of the claims, or equivalence of such meets and bounds thereof are intended to be embraced by the claims.

What is claimed is:

1. An imaging device comprising:

a storage section which correlates and stores shooting scenes, sample images and additional information;

a first display control section for simultaneously displaying in a display section a plurality of the sample images stored in the storage section;

a selection section for selecting any one sample image from among the plurality of sample images simultaneously displayed in the display section by the first display control section;

a second display control section for controlling the display section to change from displaying by the first display control section to, in response to a predetermined zooming operation when said one sample image is selected by the selection section, displaying the selected sample image and additional information correlated and stored in the storage section for the selected sample image;

a detection section for detecting a setup instruction of a shooting scene corresponding to the selected sample image, when said one sample image from among the plurality of simultaneously displayed sample images is selected or when the selected sample image is displayed by the second display control section; and a setting section for setting an imaging condition corresponding to the shooting scene whose setup instruction is detected by the detection section.

2. The imaging device according to claim 1, wherein the first display control section further displays additional information corresponding to a selected sample image while the simultaneous display of the plurality of sample images is maintained, when any one of the plurality of sample images is selected by the selection section.

3. The imaging device according to claim 2, wherein the additional information includes at least one of contents of a shooting scene, advice information for shooting the shooting scene, and control description of an imaging condition set by the shooting scene;

wherein the first display control section displays the contents of the shooting scene among the additional information;

wherein the second display control section displays the contents of the shooting scene, the advice information for shooting the shooting scene, and the control description of the imaging condition to be set by the shooting scene among the additional information.

4. The imaging device according to claim 1, further comprising a third display control section for controlling to display along with a captured image, a sample image of a shooting scene corresponding to a set imaging condition, after the imaging condition corresponding to the shooting scene is set.

5. The imaging device according to claim 4, wherein the third display control section further displays guidance concerning a setting together with the sample image.

6. The imaging device according to claim 1, wherein the predetermined zooming operation regulates zoom of an image displayed in the display section.

7. An imaging condition setting method for an imaging device that comprises a memory which correlates and stores shooting scenes, sample images and additional information, the method comprising:

simultaneously displaying on a display section a plurality of the sample images read out from the memory;

detecting selection of any one sample image from among the plurality of simultaneously displayed sample images;

controlling the display section to change from simultaneously displaying the plurality of sample images to, in response to a predetermined zooming operation after detecting selection of said one sample image, displaying the sample image whose selection is detected and additional information correlated and stored in the memory for the sample image whose selection is detected;

detecting a setup instruction of a shooting scene corresponding to the sample image whose selection is detected, when selection of said one sample image from among the plurality of simultaneously displayed sample images is detected or when the sample image whose selection is detected and the additional information thereof correlated and stored in the memory are displayed; and setting an imaging condition corresponding to the shooting scene whose setup instruction is detected.

8. A computer-readable recording medium having a computer-readable program stored thereon that is executable by a computer in an imaging device comprising a memory which correlates and stores shooting scenes, sample images and additional information, the program causing the computer to perform functions comprising:

simultaneously displaying on a display section a plurality of the sample images read out from the memory;

detecting selection of any one sample image from among the plurality of simultaneously displayed sample images;

controlling the display section to change from simultaneously displaying the plurality of sample images to, in response to a predetermined zooming operation after detecting selection of said one sample image, displaying the sample image whose selection is detected and additional information correlated and stored in the memory for the sample image whose selection is detected;

detecting a setup instruction of a shooting scene corresponding to the sample image whose selection is detected, when selection of said one sample image from among the plurality of simultaneously displayed sample images is detected or when the sample image whose selection is detected and the additional information thereof correlated and stored in the memory are displayed; and setting an imaging condition corresponding to the shooting scene whose setup instruction is detected.

* * * * *